(12) United States Patent
Morimoto et al.

(10) Patent No.: US 11,332,148 B2
(45) Date of Patent: May 17, 2022

(54) DRIVER ABNORMALITY DETECTION DEVICE

(71) Applicant: DENSO CORPORATION, Kariya (JP)

(72) Inventors: Hiroshi Morimoto, Kariya (JP); Yukiyasu Yoshimura, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/077,317

(22) Filed: Oct. 22, 2020

(65) Prior Publication Data
US 2021/0039654 A1 Feb. 11, 2021

Related U.S. Application Data

(63) Continuation of application No. PCT/JP2019/017460, filed on Apr. 24, 2019.

(30) Foreign Application Priority Data

Apr. 25, 2018 (JP) .............................. JP2018-084258

(51) Int. Cl.
*G08B 23/00* (2006.01)
*B60W 40/08* (2012.01)
(Continued)

(52) U.S. Cl.
CPC ............ *B60W 40/08* (2013.01); *B60W 50/14* (2013.01); *B60W 60/0016* (2020.02);
(Continued)

(58) Field of Classification Search
CPC .. B60W 40/08; B60W 60/0016; B60W 50/14; B60W 2540/21; B60W 2540/221;
(Continued)

(56) References Cited

U.S. PATENT DOCUMENTS 5,694,116 A * 12/1997 Kojima .................. G08B 21/06
340/576
8,009,051 B2 * 8/2011 Omi ..................... B60K 28/066
340/575
(Continued)

FOREIGN PATENT DOCUMENTS

JP 2004203281 A 7/2004
JP 2015054547 A 3/2015
(Continued)

*Primary Examiner* — Anh V La
(74) *Attorney, Agent, or Firm* — Harness, Dickey & Pierce, P.L.C.

(57) ABSTRACT

A driver abnormality detection device detects an abnormality in a driver of a vehicle. A first notification is performed in response to detecting the abnormality. It is determined whether a first input by the driver has been detected in a first input period set after a start of the first notification. A second notification is performed in response to determining that the first input has been detected in the first input period. It is determined whether a second input by the driver has been detected in a second input period set after a start of the second notification. A first abnormality condition process is executed in response to determining that the first input has not been detected in the first input period. A second abnormality condition process is executed in response to determining that the second input has not been detected in the second input period.

16 Claims, 9 Drawing Sheets

(51) Int. Cl.
  *B60W 60/00* (2020.01)
  *B60W 50/14* (2020.01)

(52) U.S. Cl.
  CPC ............... *B60W 2040/089* (2013.01); *B60W 2040/0818* (2013.01); *B60W 2040/0872* (2013.01); *B60W 2050/143* (2013.01); *B60W 2050/146* (2013.01); *B60W 2540/21* (2020.02); *B60W 2540/221* (2020.02)

(58) Field of Classification Search
  CPC . B60W 2040/0818; B60W 2040/0872; B60W 2040/089; B60W 2050/143; B60W 2050/146; G08G 1/166; G08B 21/06
  USPC .................. 340/576, 435, 439, 436, 903
  See application file for complete search history.

(56) References Cited

U.S. PATENT DOCUMENTS

| | | | |
|---|---|---|---|
| 9,235,987 B2 * | 1/2016 | Green | G08B 21/02 |
| 2006/0109094 A1 * | 5/2006 | Prakah-Asante | B60W 30/09 |
| | | | 340/435 |
| 2008/0042813 A1 * | 2/2008 | Wheatley | G08G 1/166 |
| | | | 340/435 |

FOREIGN PATENT DOCUMENTS

| | | | |
|---|---|---|---|
| JP | 2016085563 A | 5/2016 | |
| JP | 2017146788 A | 8/2017 | |

\* cited by examiner

DRIVER ABNORMALITY DETECTION DEVICE

CROSS REFERENCE TO RELATED APPLICATIONS

The present application is a continuation application of International Patent Application No. PCT/JP2019/017460 filed on Apr. 24, 2019, which designated the U.S. and claims the benefit of priority from Japanese Patent Application No. 2018-084258 filed on Apr. 25, 2018. The entire disclosures of all of the above applications are incorporated herein by reference.

TECHNICAL FIELD

The present disclosure relates to a driver abnormality detection device.

BACKGROUND

There is an on-vehicle control device that blinks a hazard inside the vehicle when detecting an abnormality in the driver. If there is no switch operation by the driver in response to blinking of the hazard inside the vehicle, the on-vehicle control device further performs blinking of the hazard outside the vehicle and processing of risk avoidance. If the driver operates the switch in response to the blinking of the hazard inside the vehicle, the on-vehicle control device determines that driving is possible.

SUMMARY

According to an example of the present disclosure, an abnormality in a driver of a vehicle is detected. A first notification is performed in response to detecting the abnormality. It is determined whether a first input by the driver has been detected in a first input period set after a start of the first notification. A second notification is performed in response to determining that the first input has been detected in the first input period. It is determined whether a second input by the driver has been detected in a second input period set after a start of the second notification. A first abnormality condition process is executed in response to determining that the first input has not been detected in the first input period. A second abnormality condition process is executed in response to determining that the second input has not been detected in the second input period.

BRIEF DESCRIPTION OF DRAWINGS

The objects, features, and advantages of the present disclosure will become more apparent from the following detailed description made with reference to the accompanying drawings. In the drawings.

DETAILED DESCRIPTION

Exemplary embodiments of the present disclosure will be described with reference to the drawings.

FIRST EMBODIMENT

1. Configuration of Driver Abnormality Detection Device 1

The configuration of a driver abnormality detection device 1 and the like will be described based on FIGS. 1 and 2. The driver abnormality detection device 1 is mounted on a vehicle 2. The driver abnormality detection device 1 includes a microcomputer. The driver abnormality detection device 1 may include one microcomputer or a plurality of microcomputers.

Figure 2:
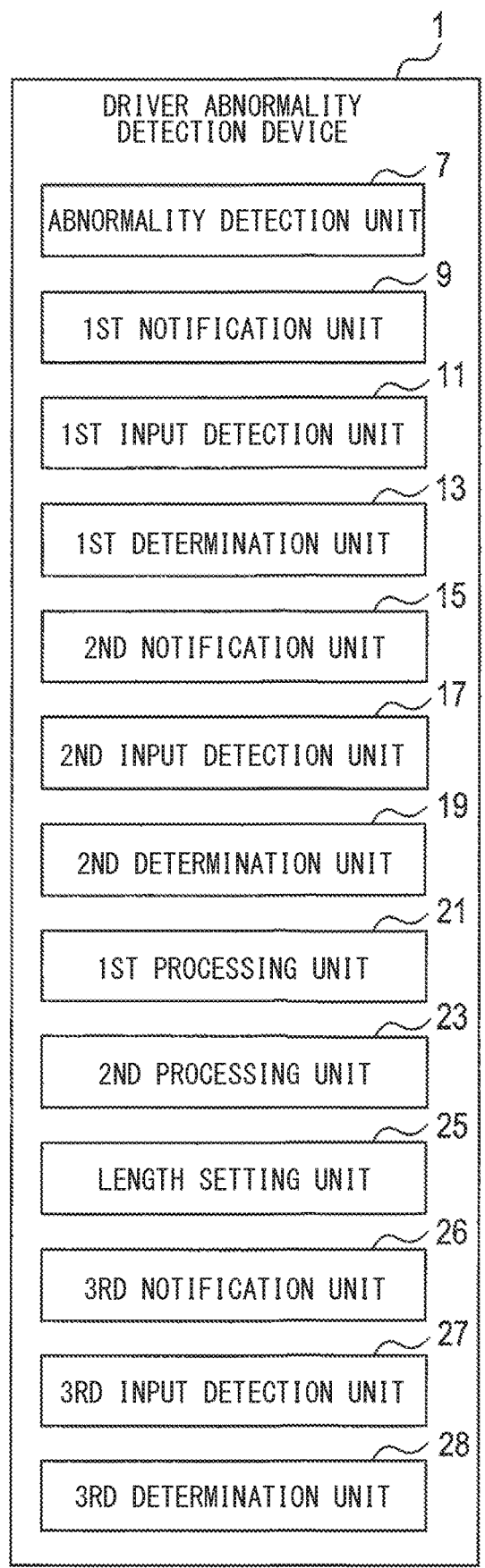
FIG. 2 is a block diagram showing a functional configuration of a driver abnormality detection device.
Figure 3:
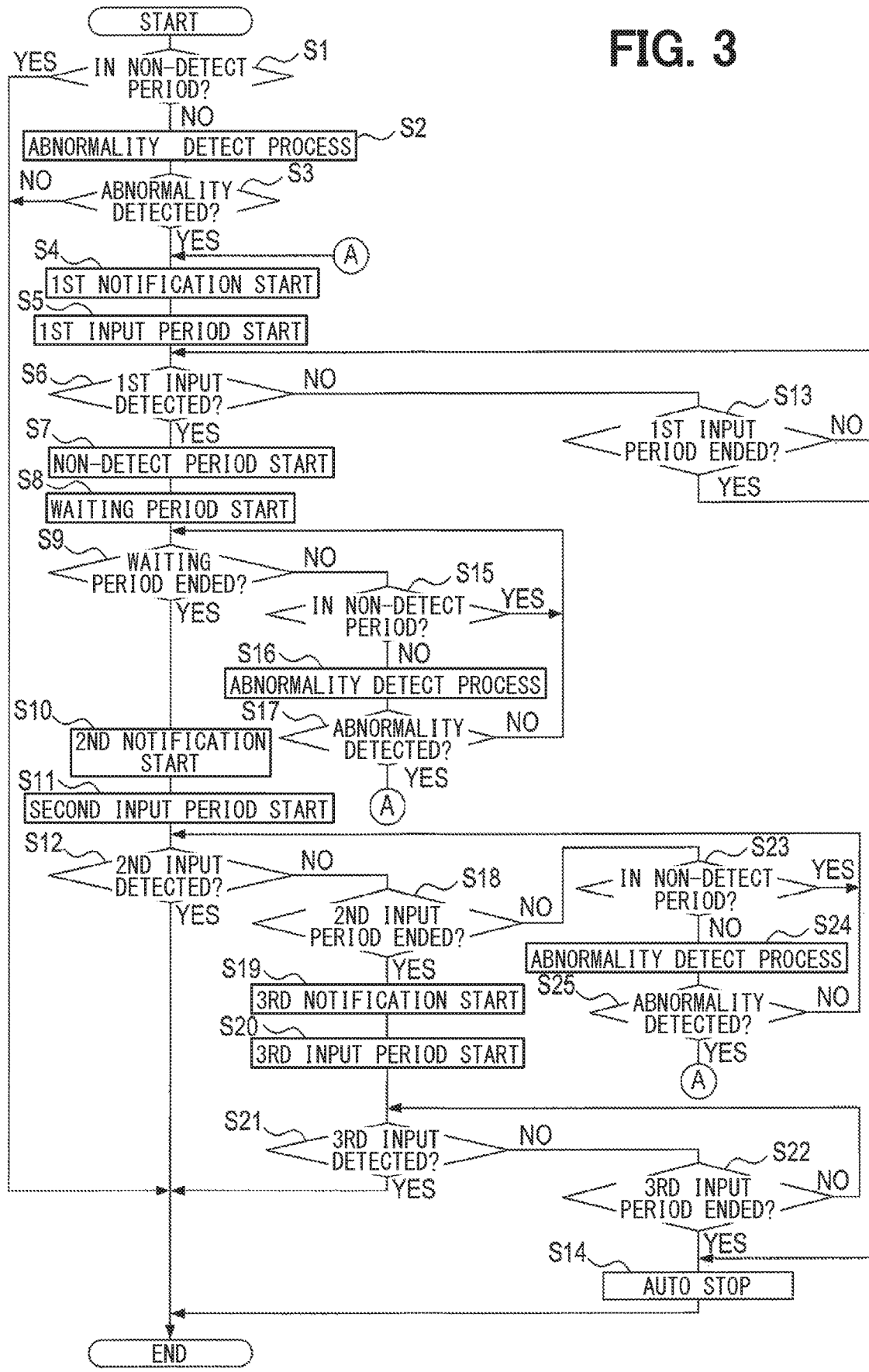
FIG. 3 is a flowchart showing a process executed by a driver abnormality detection device.

As shown in FIG. 2, the driver abnormality detection device 1 includes an abnormality detection unit 7, a first notification unit 9, a first input detection unit 11, a first determination unit 13, a second notification unit 15, a second input detection unit 17, a second determination unit 19, a first processing unit 21, a second processing unit 23, a length setting unit 25, a third notification unit 26, a third input detection unit 27, and a third determination unit 28, which are implemented by the microcomputer.

For instance, in the present embodiment, the microcomputer includes a CPU 3 and a semiconductor memory (hereinafter, referred to as a memory 5) such as a RAM or a ROM. Each function of the driver abnormality detection device 1 is realized by the CPU 3 executing a program stored in the non-transitory tangible storage medium. In this example, the memory 5 corresponds to a non-transitory tangible storage medium storing a program. With the execution of the program, a method corresponding to the program is executed.

The technique of realizing each of the functions of the units implemented by the microcomputer included in the driver abnormality detection device 1 is not limited to software (i.e., by the CPU 3 and the memory 5), and a part or all of the functions thereof may be realized by using one or a plurality of hardware circuits included in the microcomputer. For example, when the above-described function may be implemented by an electronic circuit which is hardware, the electronic circuit may be implemented by a digital circuit, an analog circuit, or a combination thereof.

In other words, the microcomputer included in the driver abnormality detection device 1 according to the present disclosure may be implemented as one or more special-purposed computers. Such a special-purposed computer may be provided (i) by configuring (a) a processor and a memory programmed to execute one or more functions embodied by a computer program, or (ii) by configuring (b) a processor including one or more dedicated hardware logic circuits, or (iii) by configuring by a combination of (a) a processor and a memory programmed to execute one or more functions embodied by a computer program and (b) a processor including one or more dedicated hardware logic circuits.

Figure 1:
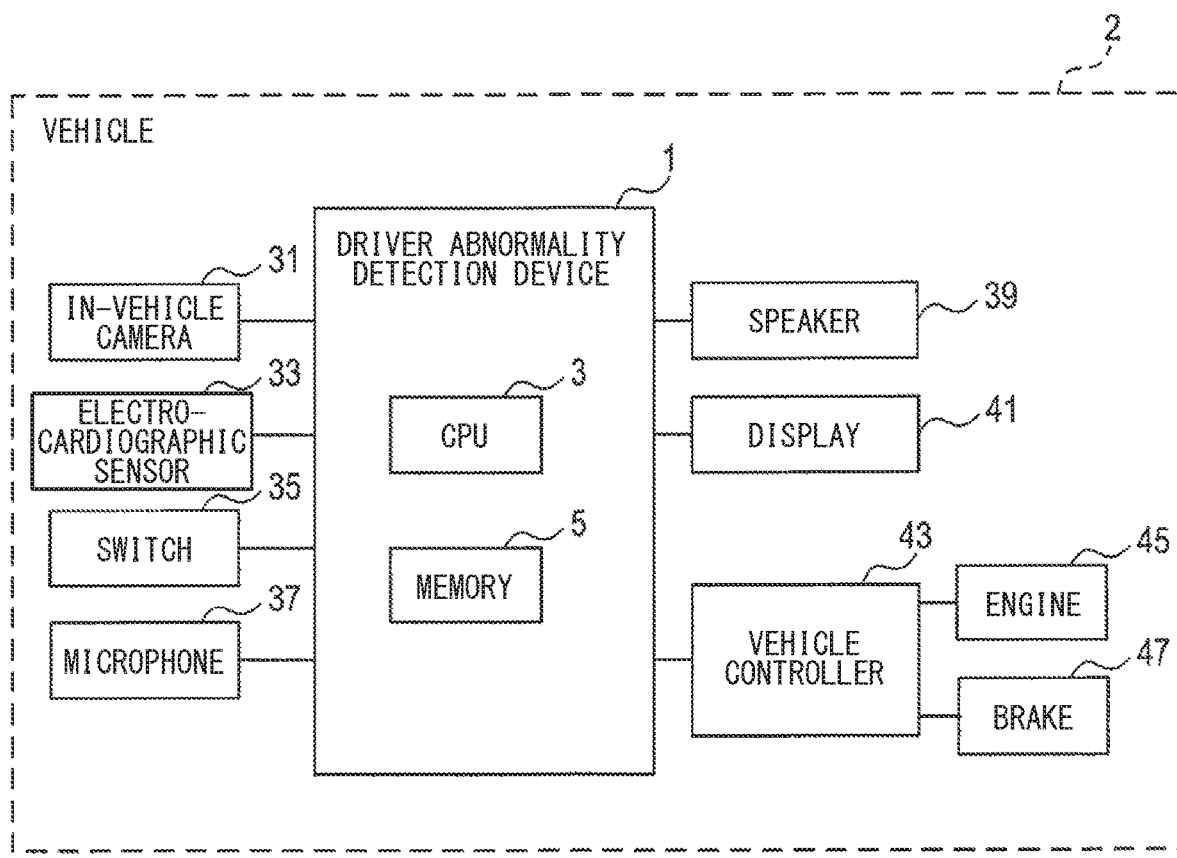
FIG. 1 is a block diagram showing a configuration of a driver abnormality detection device.

In addition to the driver abnormality detection device 1, the vehicle 2 includes an in-vehicle camera 31, an electrocardiographic sensor 33, a switch 35, a microphone 37, a speaker 39, a display 41, and a vehicle controller 43, which are connected with the driver abnormality detection device 1 via a communication link, as shown in FIG. 1. The vehicle 2 further includes an engine 45, and a brake 47, which are connected with the vehicle controller 43. The in-vehicle camera 31 and the electrocardiographic sensor 33 may function as sensors sensing the state of the driver, as described below. The switch 35 and the microphone 37 may function as input interface instruments, as described below. The speaker 39 and the display 41 may function as output interface instruments, as described below.

The in-vehicle camera 31 is provided in the vehicle interior of the vehicle 2. The in-vehicle camera 31 captures an image of the upper half of the driver of the vehicle 2 (hereinafter also simply referred to as a driver) and creates an image. The electrocardiographic sensor 33 detects the electrocardiogram of the driver. The switch 35 is provided in the vehicle interior of the vehicle 2. The switch 35 is operated by the driver. The microphone 37 is provided in the vehicle interior of the vehicle 2. The microphone 37 detects speeches. The speeches include an utterance uttered by the driver. The speaker 39 is provided in the vehicle interior of the vehicle 2. The speaker 39 outputs speeches. The display 41 is provided in the vehicle interior of the vehicle 2 at a position visible to the driver. The display 41 displays images. The vehicle controller 43 controls the engine 45 and the brake 47.

2. Processes Executed by Driver Abnormality Detection Device 1

The processes executed by the driver abnormality detection device 1 will be described with reference to FIGS. 3 to 8. In step 1 of FIG. 3, the abnormality detection unit 7 determines whether it is in the non-detection period. The non-detection period is a period in which the abnormality detection process of steps 2, 16, and 24 described later is not executed. The non-detection period is started in step 7 described later. The non-detection period continues until the preset time elapses after the start of the non-detection period.

If it is not in the non-detection period, the process proceeds to step 2. If it is in the non-detection period, this process ends.

In step 2, the abnormality detection unit 7 executes a process of detecting an abnormality in the driver using the in-vehicle camera 31 and the electrocardiographic sensor 33. Examples of the abnormality in the driver include an abnormality in which the posture of the driver deviates from the normal posture (hereinafter referred to as posture abnormality). The driver's abnormality includes an abnormality in which the driver's heartbeat is out of the normal range (hereinafter, referred to as heartbeat abnormality). The abnormality in the driver includes an abnormality in which the eyes of the driver are continuously closed for a predetermined time or more (hereinafter, referred to as eye-closure abnormality).

The abnormality detection unit 7 uses the in-vehicle camera 31 to acquire an image representing the upper body of the driver. The abnormality detection unit 7 recognizes the posture of the driver in the acquired image. The abnormality detection unit 7 detects the posture abnormality by comparing the recognized posture with the normal posture. The normal posture is stored in the memory 5 in advance.

The abnormality detection unit 7 uses the electrocardiographic sensor 33 to acquire the driver's heartbeat. The abnormality detection unit 7 compares the acquired heartbeat with the normal range of the heartbeat to detect a posture abnormality. The normal range of the heartbeat is stored in the memory 5 in advance.

The abnormality detection unit 7 uses the in-vehicle camera 31 to repeatedly acquire an image representing the driver's face. The abnormality detection unit 7 recognizes the eyes in each of the plurality of acquired images. The abnormality detection unit 7 detects the eye-closure abnormality based on the state of the eyes recognized in the plurality of images.

In step 3, the first notification unit 9 determines whether the abnormality in the driver has been detected in step 2. If it is determined that the driver abnormality has been detected, the process proceeds to step 4. When it is determined that the driver abnormality has not been detected, this process ends.

In step 4, the first notification unit 9 starts the first notification. The first notification is a process of outputting a warning sound using the speaker 39 and displaying a warning image using the display 41. The first notification continues until the first input period described below ends.

In step 5, the first input detection unit 11 starts the first input period. The start of the first input period is after the start of the first notification. The first input period is a period in which the first input detection unit 11 detects the first input by the driver. The first input is an operation of the switch 35. The first input period continues until the first input detection unit 11 detects the first input or until a preset time T1 elapses from the start of the first input period.

In step 6, the first determination unit 13 determines whether the first input detection unit 11 has detected the first input. If it is determined that the first input has been detected, the process proceeds to step 7. If it is determined that the first input has not been detected, the process proceeds to step 13.

In step 7, the abnormality detection unit 7 starts the non-detection period.

In step 8, the second notification unit 15 starts the waiting period. As a general rule, the waiting period continues from the start of the waiting period until a preset time Tw elapses. Note that when it is determined that an abnormality has been detected in step 17 described later, the waiting period ends at the time of the determination.

In step 9, the second notification unit 15 determines whether the waiting period is ended. If it is determined that the waiting period is ended, the process proceeds to step 10. If it is determined that the waiting period is not ended, the process proceeds to step 15.

In step 10, the second notification unit 15 starts the second notification. The second notification is a process of outputting a speech "Please say OK" using the speaker 39 and displaying a character "Please say OK" using the display 41. The second notification continues until the second input period described below ends.

In step 11, the second input detection unit 17 starts the second input period. The start of the second input period is after the start of the second notification. The second input period is a period in which the second input detection unit 17 detects the second input by the driver. The second input is that the driver speaks "OK". The second input detection unit 17 detects the driver's utterance using the microphone 37. The second input period continues until the second input detection unit 17 detects the second input or the time T2 elapses from the start of the second input period.

The length of the time T2 is set by the length setting unit 25 in accordance with the type of abnormality in the driver determined to have been detected in step 3 or steps 17 and 25 described later. The length of time T2 differs depending on the type of abnormality in the driver. The time T2 when the abnormality in the posture has been detected is shorter than the time T2 when the abnormality in the closed eyes has been detected.

In step 12, the second determination unit 19 determines whether the second input detection unit 17 has detected the second input. If it is determined that the second input has been detected, the process ends. If it is determined that the second input has not been detected, the process proceeds to step 18.

When a negative determination is made in step 6, the process proceeds to step 13. In step 13, the first determination unit 13 determines whether the first input period has ended because the time T1 has elapsed from the start of the first input period. If it is determined that the first input period is ended, the process proceeds to step 14. When it is determined that the first input period has not ended, the process proceeds to step 6.

In step 14, the first processing unit 21 uses the vehicle controller 43 to execute the first abnormality condition process. The first abnormality condition process is a process of stopping the vehicle.

When a negative determination is made in step 9, the process proceeds to step 15. In step 15, the abnormality detection unit 7 determines whether it is in the non-detection period. If it is determined that it is not in the non-detection period, the process proceeds to step 16. When it is determined that it is in the non-detection period, the process proceeds to step 9.

In step 16, the abnormality detection unit 7 executes a process of detecting an abnormality in the driver using the in-vehicle camera 31 and the electrocardiographic sensor 33. The process of detecting an abnormality in the driver is the same as the process of step 2.

In step 17, the second notification unit 15 determines whether the driver abnormality has been detected in step 16. If it is determined that the driver abnormality has been detected, the process proceeds to step 4. When it is determined that the driver abnormality has not been detected, the process proceeds to step 9.

When a negative determination is made in step 12, the process proceeds to step 18. In step 18, the second determination unit 19 determines whether the second input period is ended because the time T2 has elapsed from the start of the second input period. If it is determined that the second input period is ended, the process proceeds to step 19. If it is determined that the second input period is not ended, the process proceeds to step 23. The processing of steps 19, 20, 21, 22, and 14 corresponds to a second abnormality condition process.

In step 19, the third notification unit 26 starts the third notification. The third notification is a process of outputting a warning sound using the speaker 39 and displaying a warning image using the display 41. The third notification continues until the third input period described below ends.

In step 20, the third input detection unit 27 starts the third input period. The start of the third input period is after the start of the third notification. The third input period is a period in which the third input detection unit 27 detects the third input by the driver. The third input is an operation of the switch 35. The third input period continues until the third input detection unit 27 detects the third input or until the preset time T3 elapses from the start of the third input period.

In step 21, the third determination unit 28 determines whether the third input detection unit 27 has detected the third input. If it is determined that the third input has been detected, the process ends. If it is determined that the third input has not been detected, the process proceeds to step 22.

In step 22, the third determination unit 28 determines whether the third input period has ended because the time T3 has elapsed from the start of the third input period. If it is determined that the third input period has ended, the process proceeds to step 14. If it is determined that the third input period has not ended, the process proceeds to step 21.

When a negative determination is made in step 18, the process proceeds to step 23. In step 23, the abnormality detection unit 7 determines whether it is in the non-detection period. If it is determined that it is not in the non-detection period, the process proceeds to step 24. If it is determined that it is in the non-detection period, the process proceeds to step 12.

In step 24, the abnormality detection unit 7 executes a process of detecting an abnormality in the driver using the in-vehicle camera 31 and the electrocardiographic sensor 33. The process of detecting an abnormality in the driver is the same as the process of step 2.

In step 25, the second determination unit 19 determines whether the driver abnormality has been detected in step 24. If it is determined that the driver abnormality has been detected, the process proceeds to step 4. When it is determined that the driver abnormality has not been detected, the process proceeds to step 12.

Figure 4:
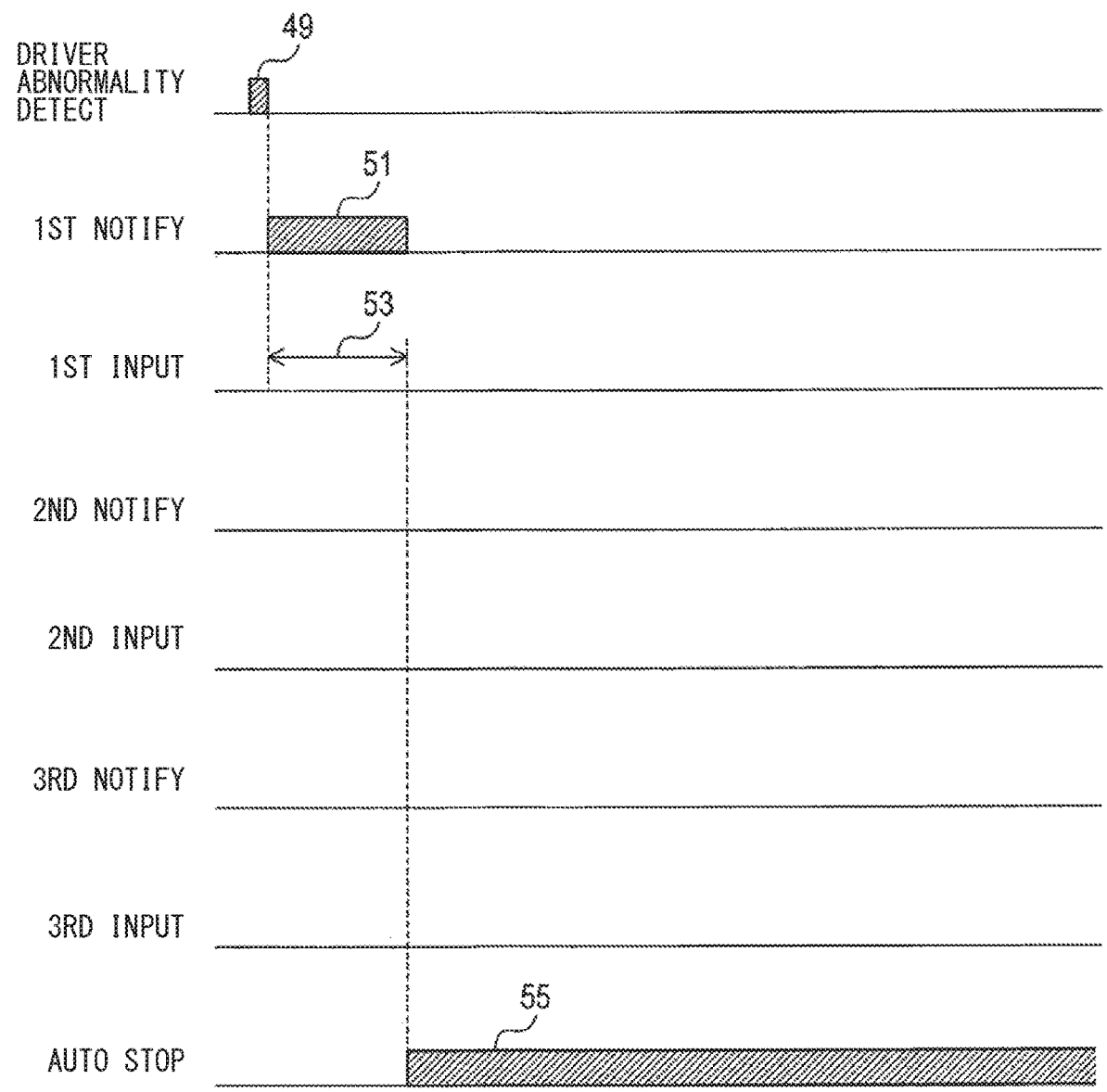
FIG. 4 is a time chart showing an example of processes executed by a driver abnormality detection device.

FIG. 4 is a time chart showing an example of processes executed by the driver abnormality detection device 1. In steps 2 and 3, the driver abnormality detection device 1 has detected the driver abnormality 49. Next, in step 4, the driver abnormality detection device 1 starts the first notification 51. Further, in step 5, the driver abnormality detection device 1 starts the first input period 53.

Next, in steps 6 and 13, the driver abnormality detection device 1 determines that the first input has not been detected by the end of the first input period 53. Therefore, the driver abnormality detection device 1 performs the process 55 of automatic stop in step 14.

Figure 5:
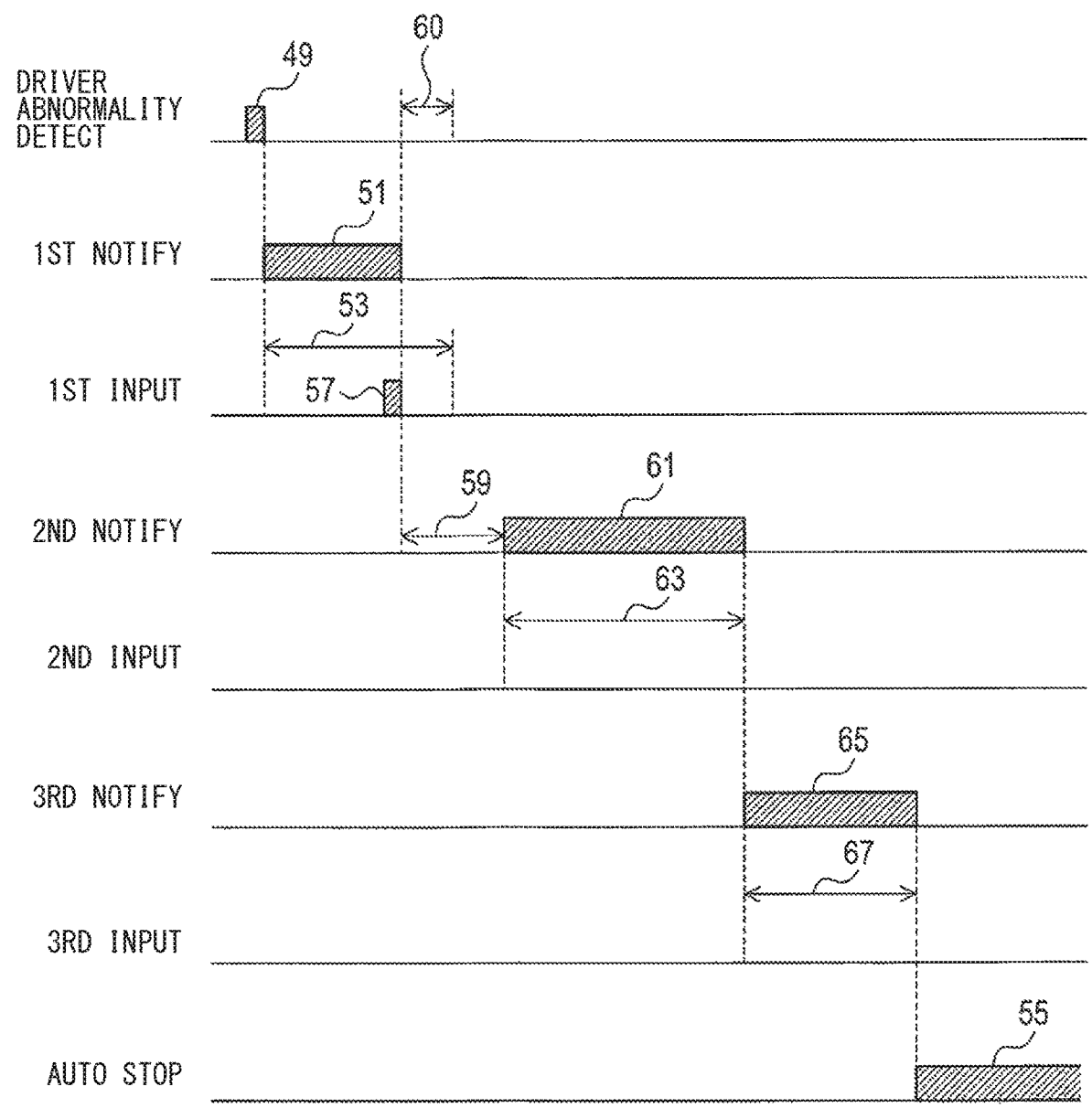
FIG. 5 is a time chart showing an example of processes executed by a driver abnormality detection device.

FIG. 5 is a time chart showing an example of processes executed by the driver abnormality detection device 1. In steps 2 and 3, the driver abnormality detection device 1 has detected the driver abnormality 49. Next, in step 4, the driver abnormality detection device 1 starts the first notification 51. Further, in step 5, the driver abnormality detection device 1 starts the first input period 53.

Next, in step 6, the driver abnormality detection device 1 determines that the first input 57 has been detected. Next, in step 8, the driver abnormality detection device 1 starts the waiting period 59. Further, in step 7, the driver abnormality detection device 1 starts the non-detection period 60. After the end of the waiting period 59, in step 10, the driver abnormality detection device 1 starts the second notification 61. Further, in step 11, the driver abnormality detection device 1 starts the second input period 63.

Next, in steps 12 and 18, the driver abnormality detection device 1 determines that the second input has not been detected by the end of the second input period 63.

Next, in step 19, the driver abnormality detection device 1 starts the third notification 65. Further, in step 20, the driver abnormality detection device 1 starts the third input period 67.

Next, in steps 21 and 22, the driver abnormality detection device 1 determines that the third input has not been detected by the end of the third input period 67. Therefore, the driver abnormality detection device 1 performs the process 55 of automatic stop in step 14.

Figure 6:
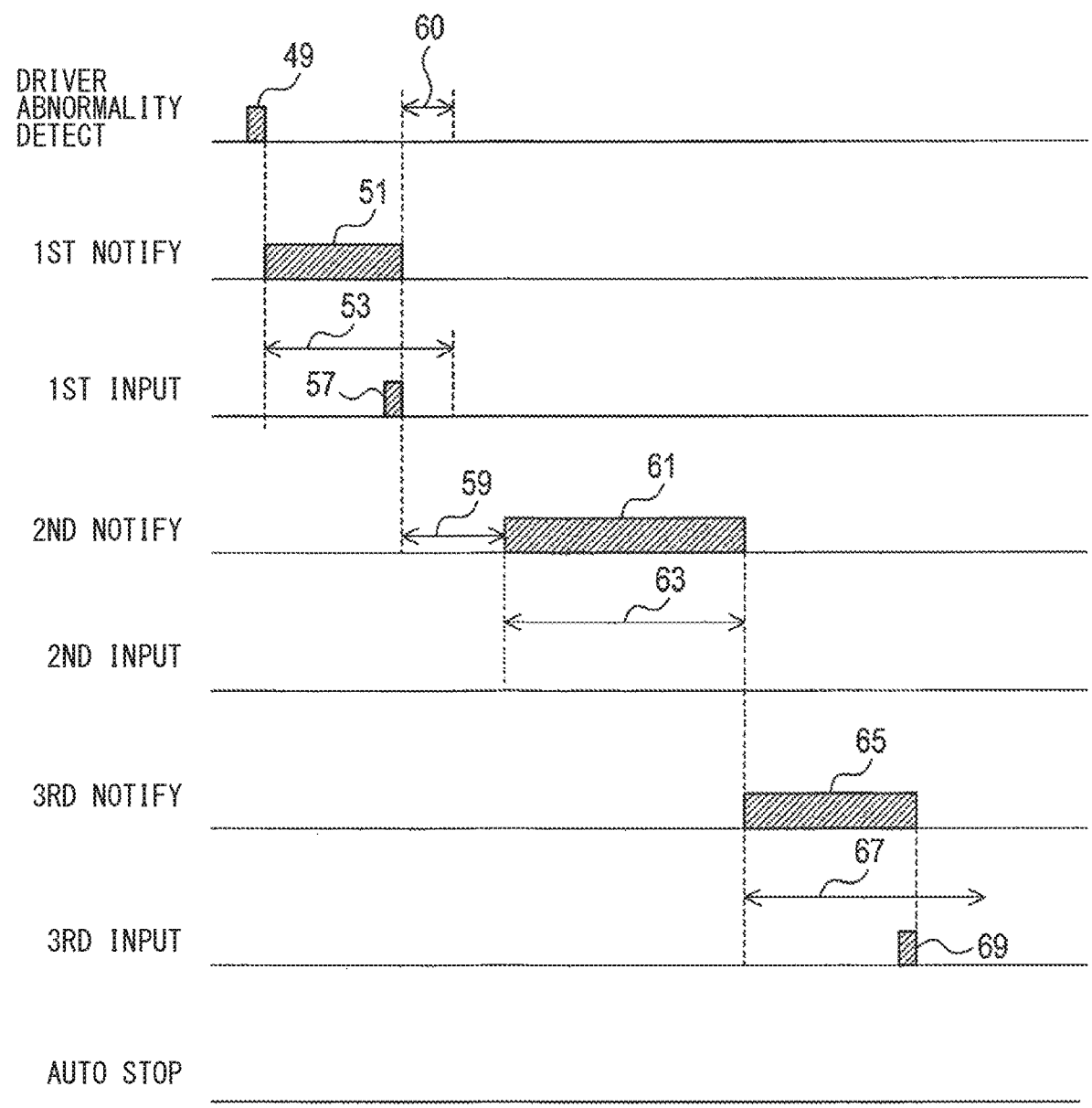
FIG. 6 is a time chart showing an example of processes executed by a driver abnormality detection device.

FIG. 6 is a time chart showing an example of processes executed by the driver abnormality detection device 1. In steps 2 and 3, the driver abnormality detection device 1 has detected the driver abnormality 49. Next, in step 4, the driver abnormality detection device 1 starts the first notification 51. Further, in step 5, the driver abnormality detection device 1 starts the first input period 53.

Next, in step 6, the driver abnormality detection device 1 determines that the first input 57 has been detected. Next, in step 8, the driver abnormality detection device 1 starts the waiting period 59. Further, in step 7, the driver abnormality detection device 1 starts the non-detection period 60. After the end of the waiting period 59, in step 10, the driver abnormality detection device 1 starts the second notification 61. Further, in step 11, the driver abnormality detection device 1 starts the second input period 63.

Next, in steps 12 and 18, the driver abnormality detection device 1 determines that the second input has not been detected by the end of the second input period 63. Next, in step 19, the driver abnormality detection device 1 starts the third notification 65. Further, in step 20, the driver abnormality detection device 1 starts the third input period 67.

Next, in step 21, the driver abnormality detection device 1 determines that the third input has been detected. Therefore, the driver abnormality detection device 1 has returned to the normal state.

Figure 7:
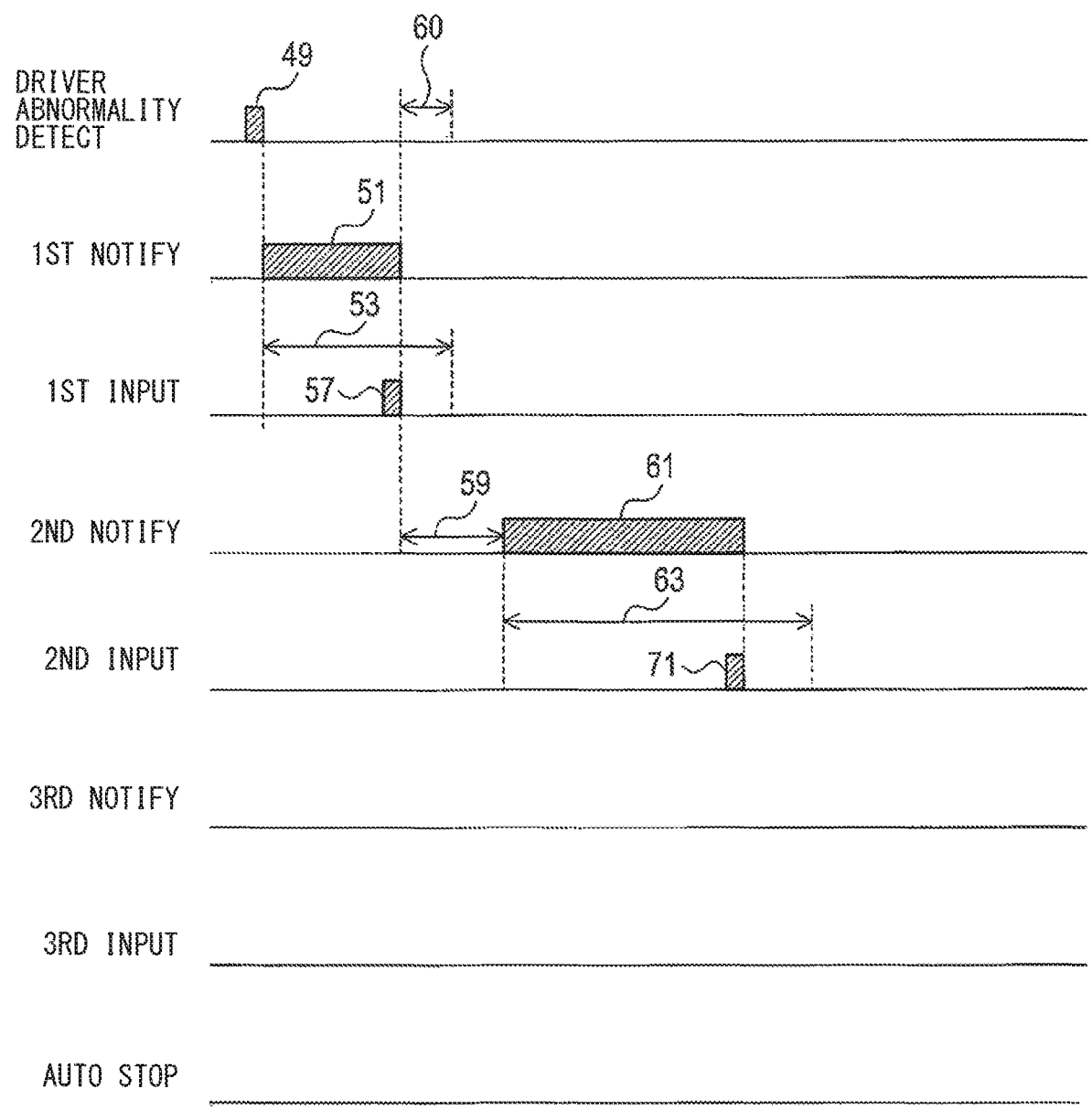
FIG. 7 is a time chart showing an example of processes executed by a driver abnormality detection device.

FIG. 7 is a time chart showing an example of processes executed by the driver abnormality detection device 1. In steps 2 and 3, the driver abnormality detection device 1 has detected the driver abnormality 49. Next, in step 4, the driver abnormality detection device 1 starts the first notification 51. Further, in step 5, the driver abnormality detection device 1 starts the first input period 53.

Next, in step 6, the driver abnormality detection device 1 determines that the first input 57 has been detected. Next, in step 8, the driver abnormality detection device 1 starts the waiting period 59. Further, in step 7, the driver abnormality detection device 1 starts the non-detection period 60. After the end of the waiting period 59, in step 10, the driver abnormality detection device 1 starts the second notification 61. Further, in step 11, the driver abnormality detection device 1 starts the second input period 63.

Next, in step 12, the driver abnormality detection device 1 determines that the second input 71 has been detected. Therefore, the driver abnormality detection device 1 has returned to the normal state.

Figure 8:
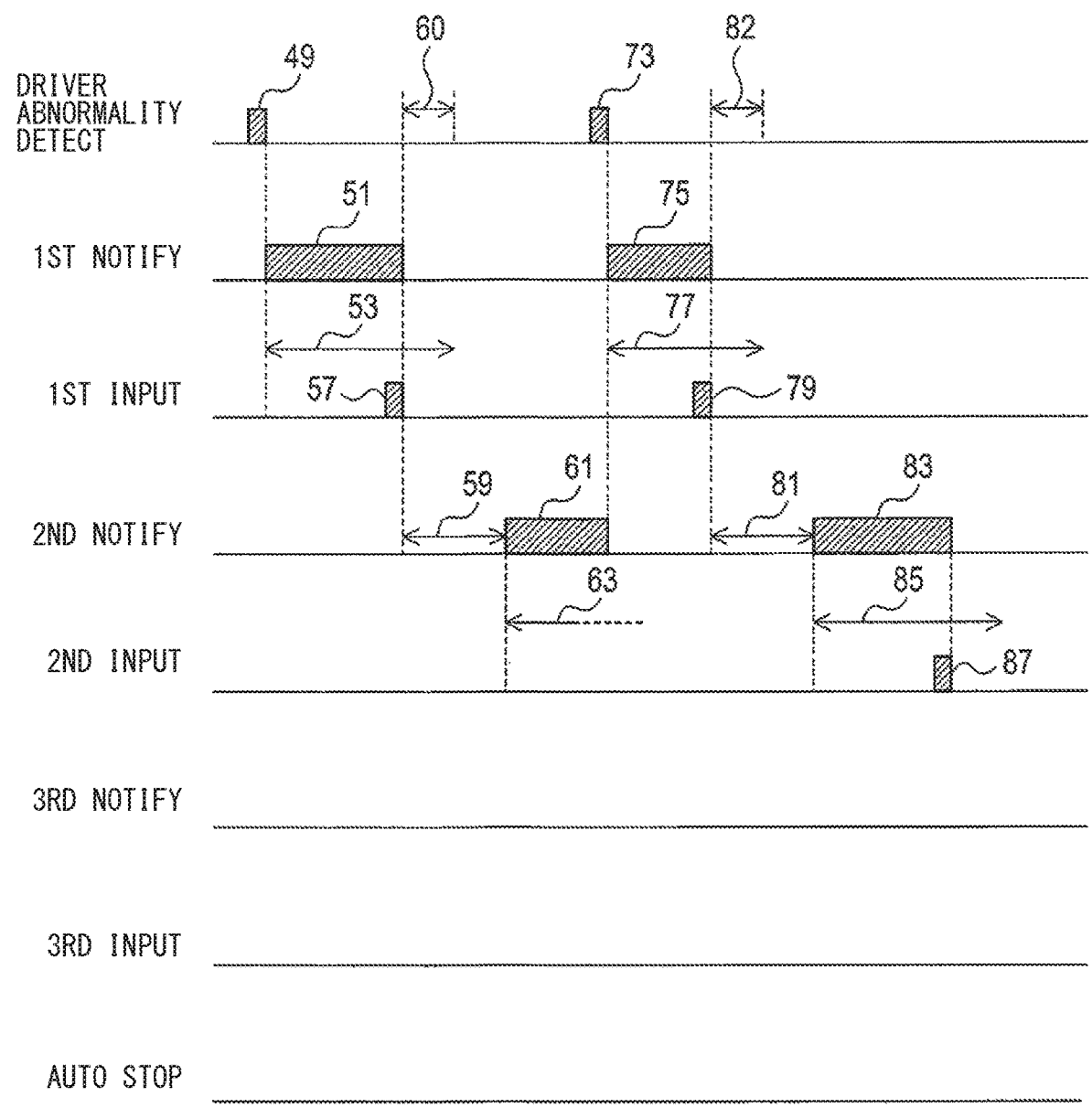
FIG. 8 is a time chart showing an example of processes executed by a driver abnormality detection device.

FIG. 8 is a time chart showing an example of processes executed by the driver abnormality detection device 1. In steps 2 and 3, the driver abnormality detection device 1 has detected the driver abnormality 49. Next, in step 4, the driver abnormality detection device 1 starts the first notification 51. Further, in step 5, the driver abnormality detection device 1 starts the first input period 53.

Next, in step 6, the driver abnormality detection device 1 determines that the first input 57 has been detected. Next, in step 8, the driver abnormality detection device 1 starts the waiting period 59. Further, in step 7, the driver abnormality detection device 1 starts the non-detection period 60. After the end of the waiting period 59, in step 10, the driver abnormality detection device 1 starts the second notification 61. Further, in step 11, the driver abnormality detection device 1 starts the second input period 63.

After the non-detection period 60 ends, the driver abnormality detection device 1 has detected the driver abnormality 73 in steps 24 and 25 executed in the middle of the second notification 61 and the second input period 63.

Next, in step 4, the driver abnormality detection device 1 starts the first notification 75. Further, in step 5, the driver abnormality detection device 1 starts the first input period 77.

Next, in step 6, the driver abnormality detection device 1 determines that the first input 79 has been detected. Next, in step 8, the driver abnormality detection device 1 starts the waiting period 81. In step 7, the driver abnormality detection device 1 starts the non-detection period 82. After the waiting period 81 ends, in step 10, the driver abnormality detection device 1 starts the second notification 83. Further, in step 11, the driver abnormality detection device 1 starts the second input period 85.

Next, in step 12, the driver abnormality detection device 1 determines that the second input 87 has been detected. Therefore, the driver abnormality detection device 1 has returned to the normal state.

3. Effects of Driver Abnormality Detection Device 1

(1A) The driver abnormality detection device 1 provides the first notification when detecting an abnormality in the driver. When the first notification is performed, the driver may perform the first input because he/she thinks that the driver can continue driving even in a serious abnormal condition. Even in cases that the driver abnormality detection device 1 has detected the first input, if the driver abnormality detection device 1 does not detect the second input in the second input period, the driver abnormality detection device 1 performs the third notification and starts the third input period. The driver abnormality detection device 1 stops the vehicle if it does not detect the third input during the third input period. Therefore, the driver abnormality detection device 1 can execute appropriate processes according to the state of the driver.

(1B) The second input is the driver's utterance. Therefore, for example, it is possible to prevent a driver who is unconscious from performing a second input.

(1C) The second input period is longer than the first input period. Therefore, the driver does not need to hurry to perform the second input. As a result, it is possible to prevent the driver's attention from being excessively focused on the execution of the second input.

(1D) The time T2 varies depending on the type of abnormality detected by the abnormality detection unit 7. Therefore, the time T2 can be appropriately set according to the type of abnormality.

(1E) The driver abnormality detection device 1 sets the non-detection period 60. Therefore, it is possible to prevent the change in the posture of the driver caused by operating the switch 35 from being detected as an abnormality in the driver.

OTHER EMBODIMENTS

Although the embodiment of the present disclosure has been described above, the present disclosure is not limited to the embodiment described above, and various modifications can be made to implement the present disclosure.

(1) The second input may be a process in which the driver decelerates or stops the vehicle. When the second input is a process in which the driver decelerates or stops the vehicle, the safety of the vehicle is further enhanced.

Figure 9:
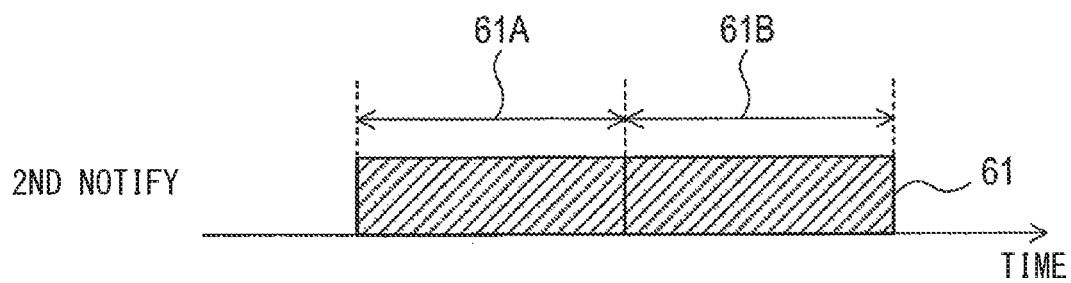
FIG. 9 is an explanatory diagram showing modes in which a driver is provided with second inputs that are different for respective time zones.

(2) The second notification unit 15 may show the driver a different second input for each time zone. For example, as shown in FIG. 9, the time zone in which the second notification 61 is performed can be divided into a first time zone 61A and a second time zone 61B. The second notification unit 15 outputs the speech "Please say OK" in the first time zone 61A. In the second time zone, the speech "Please stop the vehicle" can be output.

The second input detection unit 17 can detect the second input indicated by the second notification unit 15. For example, in the above example, the speech "OK" can be detected when the second notification unit 15 outputs the speech "Please say OK". Further, when the second notification unit 15 outputs the speech "Please stop the vehicle", the process of stopping the vehicle can be detected. In addition, the second input detection unit 17 may detect both the speech "OK" and the process of stopping the vehicle in all the time zones of the second notification 61.

(3) The abnormality detection unit 7 may detect the posture abnormality by using the tilt sensor attached to the driver. The tilt sensor detects the tilt of the driver's body.

(4) The examples of the first notification, the second notification, the first abnormality condition process, and the second abnormality condition process may be other examples. The second input may be a word or sentence other than "OK".

(5) The second input detection unit 17 may be capable of detecting an operation of the switch 35 in addition to the utterance of the driver. The operation of the switch 35 corresponds to the second input. When the second input detection unit 17 has detected the operation of the switch 35, the second determination unit 19 determines that the second input has been detected. In this case, even in cases that the second input detection unit 17 cannot normally detect the utterance of the driver, if the driver operates the switch 35, the driver can continue driving without stopping the vehicle.

(6) A plurality of functions of one element in the above embodiments may be implemented by a plurality of elements, or one function of one element may be implemented by a plurality of elements. Further, a plurality of functions of a plurality of elements may be implemented by one element, or one function implemented by a plurality of elements may be implemented by one element. In addition, a part of the configuration of the above embodiments may be omitted. At least a part of the configuration of the above embodiments may be added to or replaced with another configuration of the above embodiments. All features included in the technical idea identified by the wording described in claims correspond to embodiments of the present disclosure.

(7) The present disclosure can be implemented in various forms, in addition to the above-described driver abnormality detection device, such as a system including the driver abnormality detection device as a component, a program for causing a computer to function as the driver abnormality detection device, a non-transitory tangible storage media such as a semiconductor memory storing the program, and a driver abnormality detection method.

For reference to further explain features of the present disclosure, the description is added as follows.

An on-vehicle control device blinks a hazard inside the vehicle when detecting an abnormality in the driver. If there is no switch operation by the driver in response to blinking of the hazard inside the vehicle, the on-vehicle control device further performs blinking of the hazard outside the vehicle and processing of risk avoidance. If the driver operates the switch in response to the blinking of the hazard inside the vehicle, the on-vehicle control device determines that driving is possible.

Detailed studies by the inventors have found the following issues. Suppose that the on-vehicle control device detects an abnormality in the driver and blinks the hazard inside the vehicle. In such cases, even in an actually serious abnormality, the driver thinks that he/she can still continue driving and the driver may thereby operate the switch. As a result, the on-vehicle control device does not perform blinking of the hazard outside the vehicle or processing of risk avoidance.

According to an aspect of the present disclosure, it is desired to provide a driver abnormality detection device that can perform an appropriate process according to the state of the driver.

An aspect of the present disclosure described herein is set forth in the following clauses.

According to an aspect of the present disclosure, an abnormality detection device is provided to include an abnormality detection unit, a first notification unit, a first input detection unit, a first determination unit, a second notification unit, a second input detection unit, a second determination unit, a first processing unit, and a second processing unit.

The abnormality detection unit is configured to detect an abnormality in a driver of a vehicle. The first notification unit is configured to perform a first notification in response to the abnormality detection unit detecting the abnormality. The first input detection unit is configured to detect a first input by the driver. The first determination unit is configured to determine whether the first input has been detected by the first input detection unit in a first input period set after a start of the first notification. The second notification unit is configured to perform a second notification in response to the first determination unit determining that the first input has been detected by the first detection unit in the first input period. The second input detection unit is configured to detect a second input by the driver. The second determination unit is configured to determine whether the second input has been detected by the second input detection unit in a second input period set after a start of the second notification. The first processing unit is configured to execute a first abnormality condition process in response to the first determination unit determining that the first input has not been detected by the first input detection unit in the first input period. The second processing unit is configured to execute a second abnormality condition process in response to the second determination unit determining that the second input has not been detected by the second input detection unit in the second input period.

The driver abnormality detection device according to the aspect of the present disclosure performs the first notification when the driver abnormality has been detected. When the first notification is performed, the driver may perform the first input because he/she thinks that the driver can continue driving even in a serious abnormal condition. According to the aspect of the present disclosure, even if the first input has been detected, the driver abnormality detection device executes the second abnormality condition process in response to that the second input has not been detected in the second input period. Therefore, the driver abnormality detection device according to the aspect of the present disclosure can execute an appropriate process according to the state of the driver.

What is claimed is:

1. A driver abnormality detection device comprising:
   an abnormality detection unit configured to detect an abnormality in a driver of a vehicle;
   a first notification unit configured to perform a first notification in response to the abnormality detection unit detecting the abnormality;
   a first input detection unit configured to detect a first input by the driver;

a first determination unit configured to determine whether the first input has been detected by the first input detection unit in a first input period set after a start of the first notification;

a second notification unit configured to perform a second notification in response to the first determination unit determining that the first input has been detected by the first detection unit in the first input period;

a second input detection unit configured to detect a second input by the driver;

a second determination unit configured to determine whether the second input has been detected by the second input detection unit in a second input period set after a start of the second notification;

a first processing unit configured to execute a first abnormality condition process in response to the first determination unit determining that the first input has not been detected by the first input detection unit in the first input period; and a second processing unit configured to execute a second abnormality condition process in response to the second determination unit determining that the second input has not been detected by the second input detection unit in the second input period.

2. The driver abnormality detection device according to claim 1, wherein:
the second input is an utterance of the driver.

3. The driver abnormality detection device according to claim 1, wherein:
the second input period is longer than the first input period.

4. The driver abnormality detection device according to claim 1, wherein:
the second input is a process of stopping the vehicle.

5. The driver abnormality detection device according to claim 1, further comprising:
a length setting unit configured to set a length of the second input period such that the length of the second input period varies depending on a type of the abnormality detected by the abnormality detection unit.

6. The driver abnormality detection device according to claim 1, wherein:
the second notification unit is configured to indicate the second input, which is different for each time zone, to the driver; and
the second input detection unit is configured to detect the second input indicated by the second notification unit.

7. The driver abnormality detection device according to claim 1, wherein:
in response to the first input determination unit determining that the first input has not been detected in the first input period,
the second notification unit is configured not to execute the second notification, whereas
the first processing unit is configured to execute (S14) the first abnormality condition process by using the vehicle controller.

8. The driver abnormality detection device according to claim 1, wherein:
in response to the first input determination unit determining that the first input has been detected in the first input period, the first processing unit is configured not to execute the first abnormality condition process by using the vehicle controller whereas the second notification unit is configured to execute the second notification via the output interface instrument.

9. A driver abnormality detection device comprising
one or more than one computer connected, via an in-vehicle communication link, with a sensor sensing a state of a driver of a vehicle, an input interface instrument via which the driver performs an input operation, an output interface instrument via which the driver is notified, and a vehicle controller controlling the vehicle, the computer being configured to:
detect an abnormality in the driver of the vehicle by using the sensor;
perform a first notification via the output interface instrument in response to detecting the abnormality;
detect a first input by the driver via the input interface instrument;
determine whether the first input has been detected in a first input period set after a start of the first notification;
perform a second notification via the output interface instrument in response to determining that the first input has been detected in the first input period;
detect a second input by the driver via the input interface instrument;
determine whether the second input has been detected in a second input period set after a start of the second notification;
execute a first abnormality condition process by using the vehicle controller in response to determining that the first input has not been detected in the first input period; and
execute a second abnormality condition process by using the vehicle controller in response to determining that the second input has not been detected in the second input period.

10. The driver abnormality detection device according to claim 9, wherein:
the computer is further configured to set a length of the second input period such that the length of the second input period varies depending on a type of the detected abnormality.

11. The driver abnormality detection device according to claim 9, wherein:
the computer is further configured to
indicate the second input, which is different for each time zone, to the driver, and
detect the indicated second input.

12. The driver abnormality detection device according to claim 9, wherein:
in response to determining that the first input has not been detected in the first input period,
the computer is configured not to execute the second notification but execute the first abnormality condition process by using the vehicle controller.

13. The driver abnormality detection device according to claim 9, wherein:
in response to determining that the first input has been detected in the first input period, the computer is further configured not to execute the first abnormality condition process by using the vehicle controller but execute the second notification via the output interface instrument.

14. A computer-implemented method for a driver abnormality detection device that is connected, via an in-vehicle communication link, with a sensor sensing a state of a driver of a vehicle, an input interface instrument via which the driver performs an input operation, an output interface instrument via which the driver is notified, and a vehicle controller controlling the vehicle, the method comprising:

detecting an abnormality in the driver of the vehicle by using the sensor;

performing a first notification via the output interface instrument in response to detecting the abnormality;

determining whether a first input has been detected via the input interface instrument in a first input period set after a start of the first notification;

performing a second notification via the output interface instrument in response to determining that the first input has been detected in the first input period;

determining whether a second input has been detected via the input interface instrument in a second input period set after a start of the second notification;

executing a first abnormality condition process by using the vehicle controller in response to determining that the first input has not been detected in the first input period; and executing a second abnormality condition process by using the vehicle controller in response to determining that the second input has not been detected in the second input period.

15. The method according to claim 14, wherein:

in response to determining that the first input has not been detected in the first input period, the second notification is not executed but the first abnormality condition process is executed by using the vehicle controller.

16. The method according to claim 14, wherein:

in response to determining that the first input has been detected in the first input period, the first abnormality condition process is not executed by using the vehicle controller but the second notification is executed via the output interface instrument.

* * * * *